(12) United States Patent
Deboer et al.

(10) Patent No.: US 7,692,112 B2
(45) Date of Patent: Apr. 6, 2010

(54) CONTROL MODULE

(75) Inventors: John Deboer, Decatur, GA (US); Brian Timothy McCoy, Duluth, GA (US); Drew Stephen Hancock, Sugar Hill, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 753 days.

(21) Appl. No.: 11/328,643

(22) Filed: Jan. 10, 2006

(65) Prior Publication Data

US 2007/0158171 A1 Jul. 12, 2007

(51) Int. Cl.
*H01H 3/20* (2006.01)
(52) U.S. Cl. ........................................ 200/331; 200/400
(58) Field of Classification Search .................. 200/331
See application file for complete search history.

(56) References Cited

U.S. PATENT DOCUMENTS

| | | |
|---|---|---|
| 3,706,916 A | 12/1972 | Halbeck et al. |
| 3,863,186 A | 1/1975 | Mallonen |
| 3,914,722 A | 10/1975 | Mallonen |
| 4,058,842 A | 11/1977 | Benton |
| 4,167,716 A | 9/1979 | Horn |
| 4,178,572 A | 12/1979 | Gaskill et al. |
| 4,223,288 A | 9/1980 | Stiner |
| 4,292,612 A | 9/1981 | Howell |
| 4,390,876 A | 6/1983 | Bjorklund et al. |
| 4,394,585 A | 7/1983 | Alberti |
| 4,529,951 A | 7/1985 | Youichi et al. |
| 4,531,172 A | 7/1985 | Mertz |
| 4,532,486 A | 7/1985 | Terrier |
| 4,556,882 A | 12/1985 | Brifman et al. |
| 4,604,596 A | 8/1986 | Yokoyama et al. |
| 4,616,206 A | 10/1986 | Bridges et al. |
| 4,623,859 A | 11/1986 | Erickson et al. |
| 4,625,190 A | 11/1986 | Wafer et al. |
| 4,636,760 A | 1/1987 | Lee |
| 4,680,562 A | 7/1987 | Bratkowski et al. |
| 4,714,976 A | 12/1987 | Pin et al. |
| 4,725,799 A | 2/1988 | Bratkowski et al. |
| 4,733,033 A * | 3/1988 | Morris et al. ............... 200/401 |
| 4,752,660 A | 6/1988 | Yokoyama et al. |
| 4,794,356 A * | 12/1988 | Yu et al. ....................... 335/13 |
| RE32,882 E | 3/1989 | Yokoyama et al. |
| 4,816,792 A | 3/1989 | Belbel et al. |
| 4,879,535 A | 11/1989 | Mori et al. |
| 4,897,625 A | 1/1990 | Yokoyama et al. |
| RE33,325 E | 9/1990 | Yokoyama et al. |
| 4,965,694 A | 10/1990 | Dvorak et al. |
| 5,003,139 A | 3/1991 | Edds et al. |
| 5,053,735 A | 10/1991 | Ohishi et al. |
| 5,083,103 A | 1/1992 | Winter et al. |

(Continued)

*Primary Examiner*—Michael A Friedhofer
*Assistant Examiner*—Lheiren Mae A Anglo
(74) *Attorney, Agent, or Firm*—Jose de la Rosa

(57) ABSTRACT

A control module for selectively switching electrical power from a circuit breaker with the circuit breaker including a load lug coupled to a load wire and mounted in a panelboard. The control module includes a housing in-line with and directly attached to the circuit breaker inside the panelboard and a pair of contacts coupled to an actuator mounted in the housing. One contact is coupled to the load lug and one contact is coupled to the load wire. The actuator is operated from a location remote from the control module and the contacts operate independently from the circuit breaker.

28 Claims, 3 Drawing Sheets

U.S. PATENT DOCUMENTS

| | | | |
|---|---|---|---|
| 5,089,796 A | 2/1992 | Glennon et al. | |
| 5,101,186 A | 3/1992 | Durum | |
| 5,180,051 A | 1/1993 | Cook et al. | |
| 5,184,278 A | 2/1993 | Jordan et al. | |
| 5,253,159 A | 10/1993 | Bilas et al. | |
| 5,289,148 A | 2/1994 | Siglock et al. | |
| 5,301,083 A | 4/1994 | Grass et al. | |
| 5,373,411 A | 12/1994 | Grass et al. | |
| 5,381,121 A | 1/1995 | Peter et al. | |
| 5,447,016 A | 9/1995 | Ueda et al. | |
| 5,504,284 A | 4/1996 | Lazareth et al. | |
| 5,504,290 A * | 4/1996 | Baginski et al. | 200/401 |
| 5,762,180 A | 6/1998 | Pomatto et al. | |
| 5,861,784 A | 1/1999 | Heise et al. | |
| 6,015,958 A | 1/2000 | Pomatto et al. | |
| 6,034,581 A | 3/2000 | DiMarco et al. | |
| 6,055,144 A | 4/2000 | Reid | |
| 6,075,215 A * | 6/2000 | Bollinger et al. | 200/317 |
| 6,204,741 B1 | 3/2001 | Becker et al. | |
| 6,246,928 B1 | 6/2001 | Louis et al. | |
| 6,313,723 B1 | 11/2001 | Chen et al. | |
| 6,417,775 B1 | 7/2002 | Culler et al. | |
| 6,469,600 B1 | 10/2002 | Seese et al. | |
| 6,507,255 B1 | 1/2003 | Ennis et al. | |
| 6,714,108 B1 | 3/2004 | Simms et al. | |
| 6,724,284 B2 | 4/2004 | Simms et al. | |
| 6,731,079 B2 | 5/2004 | Andersen | |
| 6,777,627 B1 * | 8/2004 | Stevenson | 200/50.21 |
| 7,005,590 B1 * | 2/2006 | Willis | 200/50.32 |

* cited by examiner

CONTROL MODULE

FIELD OF INVENTION

The present invention relates generally to the field of circuit breakers in panelboards and more particularly to control modules coupled in series with circuit breakers.

BACKGROUND OF THE INVENTION

It is not ideal to use a circuit breaker for routine switching of a circuit due to power surges which may occur when switched back on. In particular, the intended use of a circuit breaker is to protect a circuit from undesirable current conditions such as overloads and short circuits. In some cases, arc and ground fault intervention protection is also provided. A control module allows for switching of power from a circuit breaker to a load when desired. Thus, the circuit breaker is primarily used for circuit protection and the control module is primarily used for controlled circuit switching.

Some designs of control modules use multiple panels where one panel includes the breakers and the other panel includes the control modules. Designs that integrate remote control routing into one panel offer substantial advantages over designs that use multiple panels. A one panel design reduces the number of wiring leads and connections. The total wall-space of an integrated panel is often less than the combined space occupied by two independent panels. An integrated panel design, also removes the "in-the-field" wiring process between the breaker panel and the control module panel.

Previous single panel designs integrate the remote switch operation of a control module with the interruption capability of the circuit breaker into a single package. This design causes one to purchase and replace all circuit breakers within a panel in order to add the remote operation functionality and thus tends to be high in cost, large in size, and has a large number of components. Also, if the circuit breaker becomes inoperative, the entire integrated circuit breaker must be replaced. Several of these designs also have a limited lifetime due to the large mechanical motion of heavy-duty contacts that are designed for short circuit and over-current interruption. Another design mounts a relay adjacent to a circuit breaker which takes up a circuit breaker slot in the panelboard, thereby reducing the number of available circuit breakers. With such design, additional wiring is needed, thereby adding costs to the system.

Thus, there is a need for a single panel design with separate control modules, which include contacts, that may be retrofitted to any existing circuit breaker. There is a further need for a control module that does not reduce the number of available circuit breakers. There is a further need for a control module that can be replaced without also replacing the circuit breaker to which it is attached.

SUMMARY OF THE INVENTION

One embodiment of the invention relates to a control module for selectively switching electrical power from a circuit breaker with the circuit breaker including a load lug coupled to a load wire and mounted in a panelboard. The control module comprises a housing in-line with and directly attached to the circuit breaker inside the panelboard and a pair of contacts coupled to an actuator mounted in the housing. One contact is coupled to the load lug and one contact is coupled to the load wire. The actuator is operated from a location remote from the control module and the contacts operate independently from the circuit breaker.

Another embodiment of the invention relates to a panelboard for energy management of an electrical load. The panelboard comprises an enclosure including a power bus, a circuit breaker coupled to the power bus in the enclosure, and a control module attached to the circuit breaker along a longitudinal axis of the circuit breaker in the enclosure, wherein electrical power is selectively routed to the electrical load. The panelboard further comprises a data rail disposed in the enclosure and connected to the control module and a controller coupled to the data rail. The controller provides a signal to the control module to one of connect and disconnect the electrical load coupled to the circuit breaker independently of the circuit breaker in response to an input signal received by the controller from a location remote from the panelboard.

Another embodiment of the invention relates to a method for reconfiguring a panelboard having a circuit breaker coupled to an electrical load to a remotely controlled panelboard. The method comprises the steps of disconnecting the circuit breaker from the electrical load, removing a load wire from the circuit breaker, and coupling a control module to the circuit breaker inside the panelboard, wherein the control module is in-line with the circuit breaker. The method further comprises the steps of connecting the load wire to the control module, installing a data rail inside the panelboard, coupling a controller to the data rail, coupling the data rail to the control module, and coupling the data rail to the controller. The controller provides a signal to the control module to one of connect and disconnect the electrical load independently of the circuit breaker in response to an input signal received by the controller from a location remote from the panelboard.

A further embodiment provides a circuit switching control module for connecting in a circuit in series with a circuit breaker including first and second contacts. The first contact is configured to be coupled with a bus bar and a circuit breaker being configured to conduct current between the contacts and interrupt conduction if there is an undesired current between the contacts. The control module includes third and fourth contacts. The third contact is configured to be coupled with the second contact and the controller module being configured to conduct current between the third and fourth contacts based upon the application of the control signal to the control module. The first, second, third, and fourth contacts generally fall along a straight line when the third contact is coupled to the second contact. Another embodiment may provide the circuit breaker and control module each include a housing having the same width, and the sides of the housings are generally parallel with the straight line when the third contact is coupled to the second contact. The system further include a controller electromagnetically coupled to the control module to apply the control signal to the control module.

DETAILED DESCRIPTION OF THE EXEMPLARY EMBODIMENTS

Figure 1:
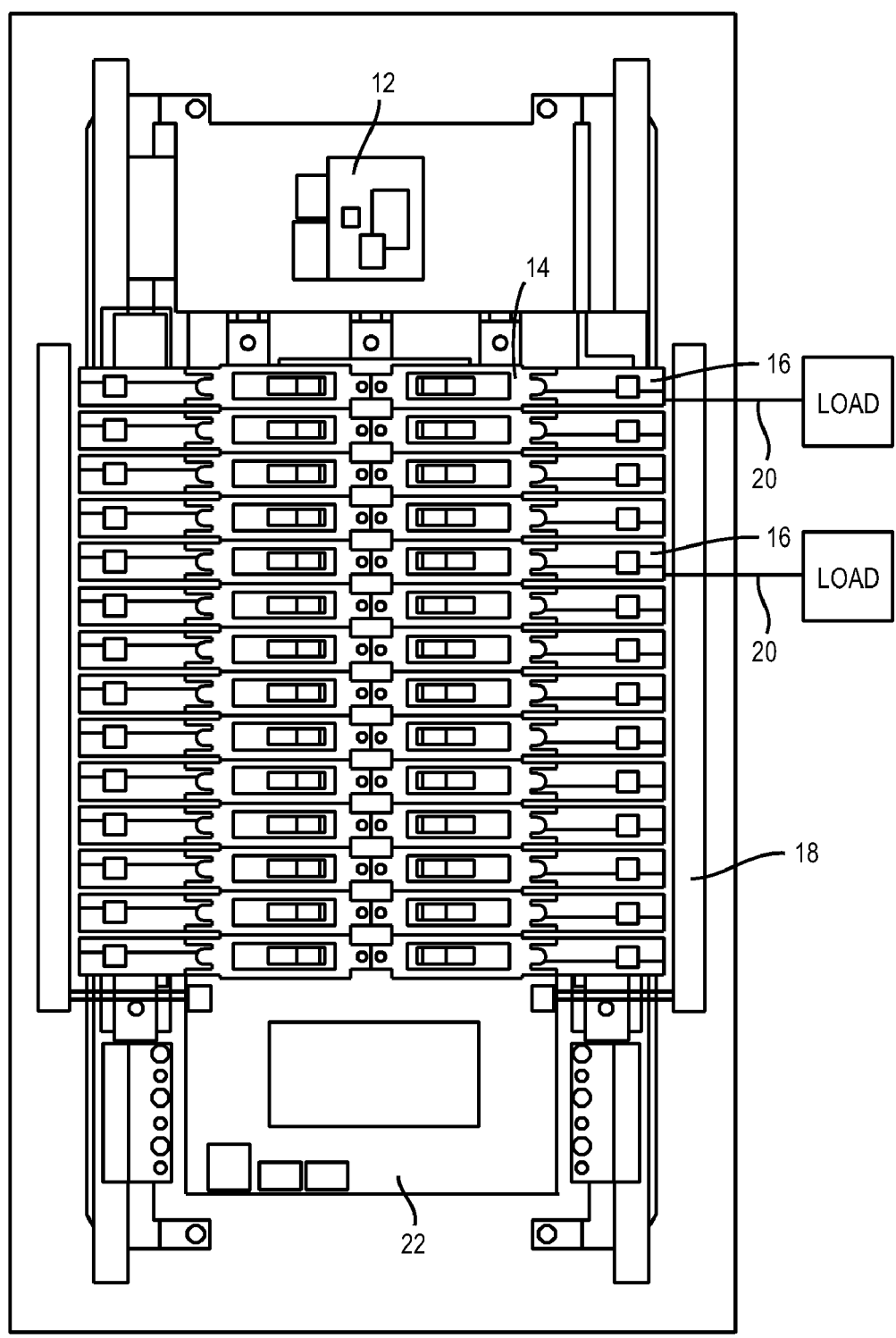
FIG. 1 is a front elevation view of a panelboard according to one example embodiment.

FIG. 1 illustrates one example of a load center, for example a panelboard 10 that controls the coupling of one or more loads to a power source and the electric power distributed to those loads. Panelboard 10 generally includes a main breaker 12, a circuit breaker 14, a control module 16, a data rail 18, a load wire 20, a controller 22 and a means for powering the control pad and controller; for example a battery or power supply circuit. Main breaker 12 is a breaker that controls the flow of current to circuit breaker 14 and may be of any known design suitable for this purpose. Circuit breaker 14 is a piece of equipment designed to protect a coupled load from damage caused by an undesired current, such as overload, short circuit, arcing or ground fault currents. The circuit breaker 14 typically includes a pair of contacts 33, 35 configured to conduct current and to interrupt conduction if there is an undesired current between the contacts. Circuit breaker 14 may be of any past, present or future design that serves this purpose.

Control module 16, which is described in detail below, is coupled to circuit breaker 14 and is configured to selectively route or switch electrical power from circuit breaker 14. Control module 16 is intended to be capable of being coupled to any circuit breaker in a retrofitted manner. Control module 16 is also intended to conserve space since control module 16 is mounted in-line with circuit breaker 14 along a horizontal axis and does not use a circuit breaker slot in panelboard 10. In one example embodiment, control module 16 performs selective routing of electrical power based on a signal received from controller 22. In other embodiments, control module 16 may perform selective routing based on local user input or locally generated data signals.

Data rail 18 is coupled to and carries electrical data signals between control module 16 and controller 22. The data rail 18 may also include power conductor for the control module 16. These electric data signals facilitate the selective routing of electrical power to circuit breaker 14. In one example embodiment, data rail 18 may enclose transmission lines of any suitable type to carry the electric data signals. In other example embodiments, data rail 18 is made of a suitable conductive material, wave guide, or optical guide capable of carrying the electric data signals between control module 16 and controller 22. While data rail 18 is shown to be along the edges of panelboard 10, in other example embodiments, data rail 18 may be in another location within panelboard 10 such as underneath circuit breaker 14 or control module 16.

The controller 22 is electromagnetically coupled to the control module 16. In one embodiment the controller 22 provides electrical data signals to control module 16 via data rail 18. These data signals are related to whether control module 16 routes power to the appropriate electrical load or not. The data signal may also be transmitted wirelessly, for example by a radio frequency or microwave transmission. In one example embodiment, controller 22 may transmit data signals to control module 16 based on a signal received from a remote source. In another embodiment, controller 22 may transmit data signals to control module 16 based on manual input from a user such as a switch or pushbutton. In still other embodiments, controller 22 may transmit data signals to control module 16 based on other factors such as a timer, local data processing signal, or the like. The controller 22 may be mounted inside the panelboard 10, as illustrated in FIG. 1 or it may be remote from the panelboard 10. It is also contemplated that the controller 22 can be an external switch coupled to the data rail 18. The controller 22 may also include a power supply, for example a battery or a power circuit, that energizes the controller 22 and the control module 16.

Load wire 20 couples control module 16 and circuit breaker 14 to an electrical load and carries electrical power to the load when control module 16 selectively routes the power as such. In one example embodiment, the electrical load may be a lighting fixture. In another example embodiment, the electrical load may be a motor. In still other example embodiments, the electric load may be any other device that uses either alternating or direct current to function. It should be understood that in some example embodiments, panelboard (or switchboard) 10 may have multiple circuit breakers coupled to different loads. In other example embodiments, a control module 16 may be coupled to all or only selected circuit breakers as determined by an operator.

Figure 2:
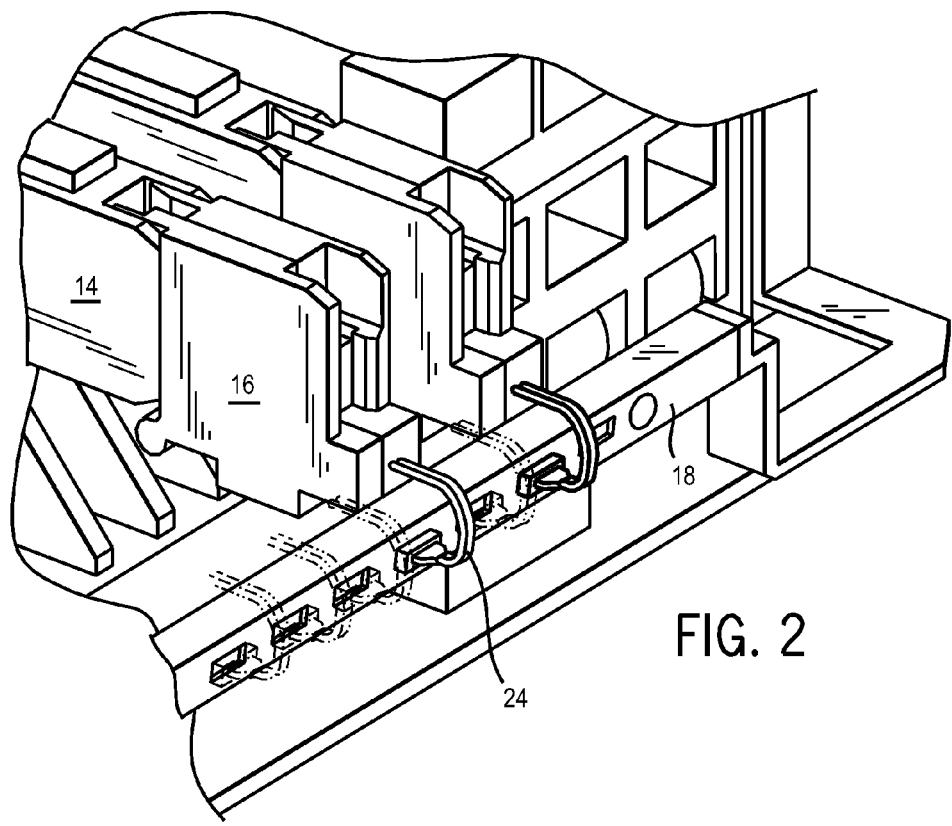
FIG. 2 is a partial perspective view of the panelboard of FIG. 1 according to one example embodiment.

FIG. 2 illustrates one example of how circuit breaker 14, control module 16, and data rail 18 is coupled together. The illustrated embodiment shows control module 16 directly coupled in-line with circuit breaker 14. Control module 16 is coupled to data rail 18 via connector 24. Connector 24 may include any wire or bus type suitable for facilitating electrical data communication between control module 16 and data rail 18. Connector 24 may be connected to data rail 18 via any known electrical connection means such as a male-female plug connection, soldered wires, wire connectors, etc.

Figure 3:
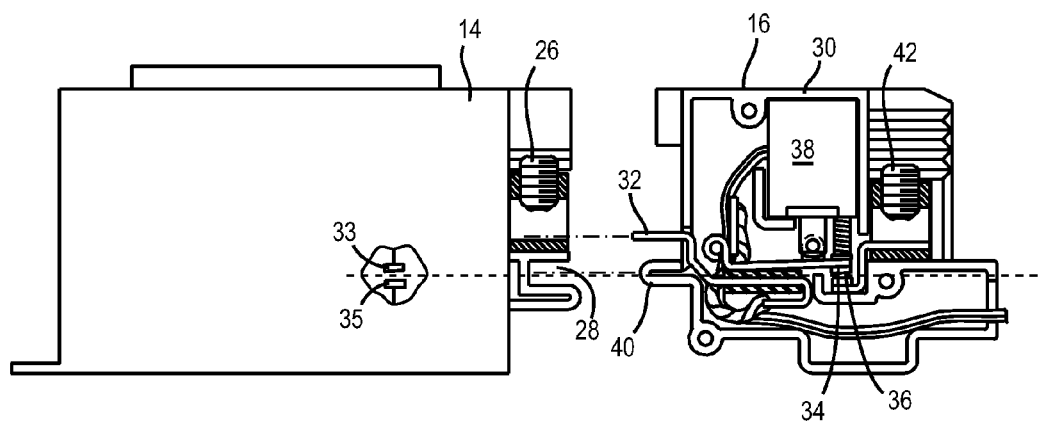
FIG. 3 is a side view of a circuit breaker and detached control module (with a cover removed) of FIG. 1 according to one example embodiment.

FIG. 3 illustrates one embodiment of the details of control module 16 and how circuit breaker 14 and control module 16 couple together. Circuit breaker 14 includes lug 26 and defines receptacle 28. Lug 26 is a contact point for connection to a load. In the illustrated embodiment, lug 26 is coupled to a power source and control module 16, to which current is supplied. Receptacle 28 mates with control module 16 for retention.

Control module 16 includes housing 30, tang 32, contact 34, contact 36, actuator 38, and lug. Housing 30 secures each element of control module 16 and includes protrusion 40, which acts as an engaging surface and mates with receptacle 28 of circuit breaker 14 so that control module 16 is retained. In one example embodiment, housing 30 may be made of a thermoplastic material. In other example embodiments, housing 30 may be made of any other suitable material such as another plastic, rubber, or properly insulated metal.

Tang 32 extends through housing 30 and couples to lug 26 of circuit breaker 14 so that power may pass to the load from the power source. Tang 32 is coupled to contact 34 and actuator 38, thus contact 34 is coupled to lug 26 of circuit breaker 14. Contact 36 is coupled to lug 42 of control module 16 and load wire 20. Lug 42 is coupled to load wire 20 and thus an electric load. The tang 32 may be of any suitable and convenient cross-section and length configured to couple to the control pad 16 and the lug 26.

When actuator 38 receives an appropriate signal from controller 22, actuator 38 is configured to cause contact 34 to touch contact 36 and thus complete a circuit from a power source and circuit breaker 14 through load wire 20 to an electric load. When a complete circuit exists and actuator 38 receives an appropriate signal from controller 22, actuator 38 is configured to cause contact 34 to disengage from contact 36 and thus break the circuit from the power source and circuit breaker 14 to load wire 20 and an electric load. In one example embodiment, actuator 38 may be a relay that brings contacts 34 and 38 together with an electromagnetic force. In another example embodiment, actuator 38 may be a motor that physically moves one of contacts 34 and 36 into contact with the other. The actuator 38 may also be a maglatch or a solenoid. Each of the conducting members of control module 16 may be composed of any properly conducting material that facilitates data and power transmission such as copper, silver, gold, or the like. In other example embodiments, one or more of the wire connections within control module 16 may be replaced by a printed circuit board (PCB) that includes proper conductive properties and contacts to facilitate the same purpose as the wires. In these embodiments, the PCB may serve only as a convenient means to conduct electrical signals or the PCB may include digital logic to modify the electrical signals.

Figure 4:
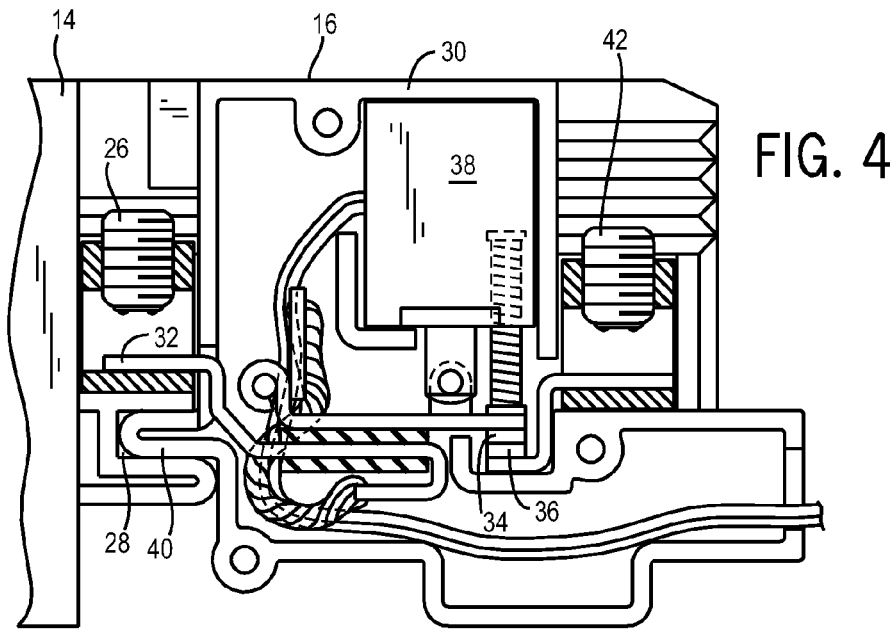
FIG. 4 is a side view of an attached control module (with a cover removed) and breaker of FIG. 1 according to one example embodiment.

FIG. 4 illustrates one example of how circuit breaker 14 and control module 16 are coupled together. Protrusion 40 of control module 16 mates with receptacle 28 of circuit breaker 14 in order to secure control module to circuit breaker 14. Tang 32 and contact 34 connect with lug 26 of circuit breaker 14. Contact 36 is coupled to lug 42 of control module and also to contact 34 due to actuator 38 having received an appropriate data signal from controller 22. Tang 32 may be composed of any properly conducting material that facilitates data and power transmission such as copper, silver, gold, or the like.

Figure 5:
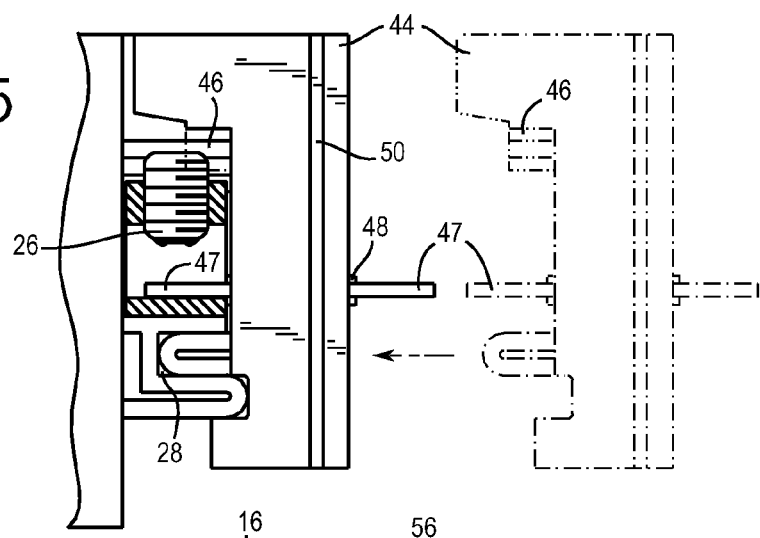
FIG. 5 is a side view of the connection between a breaker and control module interface of FIG. 1 according to one example embodiment.

FIG. 5 illustrates one example embodiment where circuit breaker 14 couples with an interface 44 that then couples to control module 16. In one example embodiment, interface 44 may be made of a thermoplastic material. In other example embodiments, interface 44 may be made of any other suitable material such as another plastic, rubber, or properly insulated metal. Interface 44 defines alignment grooves 46 and includes tang 47, insulating sleeve 48, and rib 50. Alignment grooves 46 are intended to facilitate retention of interface 44 and control module 16 to circuit breaker 14 at the same angle as and flush with circuit breaker 14. Grooves 46 press against lug 26 of circuit breaker 14 as a reference point. Interface 44 can be configured to engage different rated circuit breakers. By allowing a single control module 16 to be used with such different circuit breakers, cost savings may be realized.

Tang 47 is similar to tang 32 of control module 16 and serves the similar purpose of coupling with lug 26 of circuit breaker 14 as well as coupling with control module 16. Insulating sleeve 48 is intended to insulate tang 32 from the body of interface 44 in order to prevent heat deformation to interface 44. Rib 50 is configured to engage with housing 30 of control module 16 in order to retain and couple control module 16 to circuit breaker 14.

Figure 6:
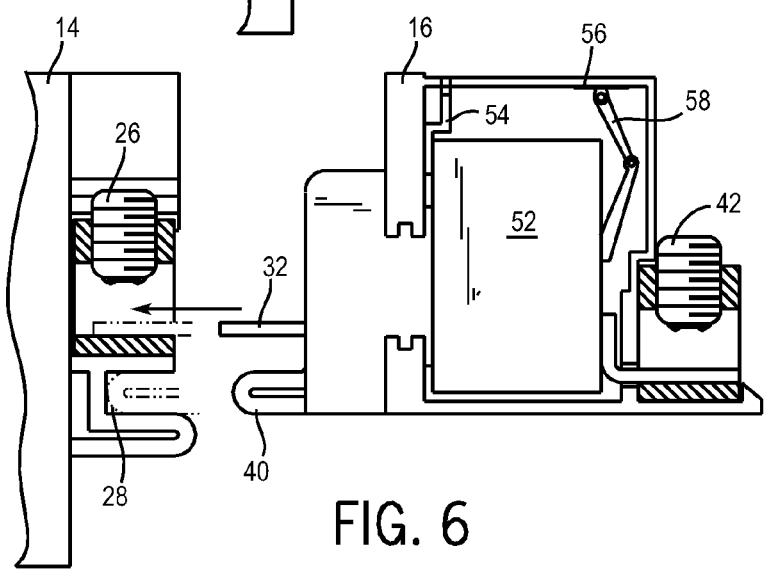
FIG. 6 is a side view of a detached control module (with a cover removed) and breaker of FIG. 1 illustrating an indicator according to one example embodiment.

FIG. 6 illustrates one example of a user interface within control module 16, which is detached from circuit breaker 14. Control module 16 includes system 52, line 54, indicator 56, and linkage 58. System 52 is a graphical representation of the inner elements of control module 16 given in FIGS. 3 and 4, or any packaged system including an actuator and two contacts configured to switch the electrical load of a circuit breaker 14.

Line 54 is an access point to control module 16. In one example embodiment, line 54 may be a communication line that facilitates data communication with actuator 38. In another example embodiment, line 54 may be a power line that is used to provide power to elements of control module 16, such as actuator 38 or an actuator contained in system 52, so that power from circuit breaker 14 may be selectively routed. In still other embodiments, line 54 may be both a communication and power line that allows low power to be transmitted with data signals.

Indicator 56 gives a physical display of a status of control module 16. In one example embodiment, indicator 56 may indicate whether contacts 34 and 36 are coupled or not completing a circuit from circuit breaker 14 to an electric load. In another example embodiment, indicator 56 may indicate if there is a problem with control module 16. In still another example embodiment, indicator 56 may be a protrusion that extends from control module. In other example embodiment, indicator 56 may be an LED, LCD, or other display.

Linkage 58 is intended to active or deactivate indicator 56. In an embodiment where indicator 56 is a physical protrusion, linkage 58 may extend the protrusion from control module 16 or move indicator laterally across control module 16 in the case of a status change. In an embodiment where indicator 56 is an electronic display, linkage 58 may extend to active indicator 56.

Although specific shapes of each element have been set forth in the drawings, each element may be of any other shape that facilitates the function to be performed by that element. For example, lug 42 of control module 16 is shown to be a cylindrical shape, however, in other embodiments the structure may define that of a relatively cylindrical form.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A circuit switching control module for connecting a circuit in series with a circuit breaker including first and second contacts, the control module comprising:
    third and fourth contacts, the third contact configured to be coupled with the second contact and the control module being configured to conduct current between the third and fourth contacts based upon the application of a control signal to the control module, the first, second, third, and fourth contacts generally falling along a straight line when the third contact is coupled to the second contact, wherein the circuit breaker and control module each include housings having the same width, and the sides of the housings are generally parallel with the straight line when the third contact is coupled to the second contact.

2. The control module of claim 1, further comprising a controller electromagnetically coupled to the control module to apply the control signal to the control module.

3. The control module of claim 2, wherein the electromagnetic coupling comprises at least one wire or a data bus.

4. A circuit switching control module for connecting a circuit in series with a circuit breaker having first and second contacts, the control module comprising:
    a tang, the tang being configured to be removably coupled with the circuit breaker;
    a load lug;
    third and fourth contacts, the third contact coupled with the tang and the fourth contact coupled with the load lug; and
    the control module being configured to conduct current between the tang and load lug based upon the application of a control signal to the control module, the first and second, and third and fourth contacts generally falling along a straight line with the circuit breaker when the tang is coupled to the circuit breaker;
    wherein the circuit breaker and control module each include housings having the same width, and the sides of the housings are generally parallel with the straight line when the first contact is coupled to the circuit breaker.

5. The control module of claim 4, wherein the control signal is provided by a source remote to the control module.

6. The control module of claim 4, wherein the control module is mounted in a panelboard and the control signal is a wireless signal provided by a source remote to the panelboard.

7. A switch connectable in series with a circuit breaker of the type located in a circuit breaker panelboard between a power bus and a load circuit, the circuit breaker having an enclosure with a width typically less than the length of the enclosure, having an axis perpendicular to the width of the enclosure, and operational to open and close an electrical connection between the power bus and the load circuit in response to an overload or short circuit, the switch comprising:
    a switch housing having a width less than or equal to the width of the circuit breaker enclosure; and
    a pair of contacts located within the switch housing and connectable in series with the circuit breaker, power bus and load circuit to selectively open and close an electrical connection between the power bus and the load circuit in response to a signal, wherein the switch is positionable relative to the circuit breaker such that both the switch housing and the circuit breaker enclosure are positioned between first and second parallel planes which are spaced at substantially the width of the enclosure.

8. A control module for selectively switching electrical power from a circuit breaker, the circuit breaker mounted in a panelboard, the control module comprising:
    a housing in-line with the circuit breaker inside the panelboard, wherein the housing is configured to be directly and removably coupled with the circuit breaker; and
    a pair of contacts coupled to an actuator mounted in the housing, with one contact coupled to the circuit breaker and one contact coupled to a load wire,
    wherein the actuator is configured to selectively switch electrical power from the circuit breaker, wherein the actuator is controlled from a location remote from the control module and operates independently from the circuit breaker, and
    wherein the housing includes a metal tang coupled to the circuit breaker.

9. The control module of claim 8, wherein the control module is coupled to a controller.

10. The control module of claim 9, wherein the controller is mounted inside the panelboard.

11. The control module of claim 8, an interface member coupled to the housing, with the interface member including a protrusion configured to engage the circuit breaker and provide a mechanical connection between the housing and the circuit breaker.

12. The control module of claim 11, wherein the interface member and housing are an integral unit.

13. The control module of claim 11, including a status indicator coupled to the actuator to signal the status of the contacts in the control module.

14. A control module for selectively switching electrical power from a circuit breaker, the circuit breaker mounted in a panelboard, the control module comprising:
    a housing in-line with the circuit breaker inside the panelboard, wherein the housing is configured to be directly and removably coupled with the circuit breaker;
    a pair of contacts coupled to an actuator mounted in the housing, with one contact coupled to the circuit breaker and one contact coupled to a load wire; and
    an interface member coupled to the housing, with the interface member including a protrusion configured to engage the circuit breaker and provide a mechanical connection between the housing and the circuit breaker,
    wherein the actuator is configured to selectively switch electrical power from the circuit breaker, wherein the actuator is controlled from a location remote from the control module and operates independently from the circuit breaker.

15. The control module of claim 14, wherein the interface member and housing are an integral unit.

16. The control module of claim 14, including a status indicator coupled to the actuator to signal the status of the contacts in the control module.

17. The control module of claim 14, wherein the control module is coupled to a controller.

18. The control module of claim 17, wherein the controller is mounted inside the panelboard.

19. A control module comprising:
an interface for coupling the control module in-line with a circuit breaker, wherein the circuit breaker includes a load lug; and
switching circuitry for selectively switching electrical power from the load lug to a load, wherein the switching circuitry operates independently of the circuit breaker and is controlled from a location remote to the control module,
wherein the control module is mounted in a panelboard and the switching circuitry is controlled from a location remote to the panelboard, and
wherein the switching circuitry is wirelessly controlled from a location remote to the panelboard.

20. The control module of claim 19, wherein the switching circuitry includes an actuator.

21. The control module of claim 20, wherein the actuator includes at least one of a relay, a motor, a maglatch and a solenoid.

22. The control module of claim 19, wherein the circuit breaker and the control module each include housings and the width of the control module housing is less than or equal to the width of the circuit breaker housing.

23. A control module comprising:
an interface for coupling the control module in-line with a circuit breaker, wherein the circuit breaker includes a load lug; and
switching circuitry for selectively switching electrical power from the load lug to a load, wherein the switching circuitry operates independently of the circuit breaker and is controlled from a location remote to the control module,
wherein the interface includes a protrusion configured to mechanically couple the control module with the circuit breaker.

24. The control module of claim 23, wherein the switching circuitry includes an actuator.

25. The control module of claim 24, wherein the actuator includes at least one of a relay, a motor, a maglatch and a solenoid.

26. The control module of claim 23, wherein the circuit breaker and the control module each include housings and the width of the control module housing is less than or equal to the width of the circuit breaker housing.

27. A circuit breaker panelboard assembly comprising:
a plurality of circuit breakers attached to a power bus, each circuit breaker having an enclosure with a width less than the length of the enclosure, and an axis perpendicular to the power bus; and
at least one control module connected in series with the circuit breaker, the control module including a housing with a width less than or equal to the width of the enclosure, and a pair of contacts connected in series with one of the circuit breakers and a load to open and close the series connection therebetween, wherein the control module is positioned along the axis of the circuit breaker,
wherein the contacts are configured to be selectively opened and closed by an actuator, wherein the control module is mounted in a panelboard and the actuator is controlled from a location remote to the panelboard, and wherein the actuator is wirelessly controlled from a location remote to the panelboard.

28. The control module of claim 27, wherein the actuator includes at least one of a relay, a motor, a maglatch and a solenoid.

* * * * *